(12) United States Patent
Giese et al.

(10) Patent No.: US 9,403,103 B2
(45) Date of Patent: Aug. 2, 2016

(54) METHOD FOR CARRYING OUT A MASS-TRANSFER PROCESS IN A COLUMN

(71) Applicant: BASF SE, Ludwigshafen (DE)

(72) Inventors: Reiner Giese, Dannenfels (DE); Stefan Haedicke, Bobenheim-Roxheim (DE); Egon Schmidt, Homburg (DE); Juergen Paschold, Hochspeyer (DE); Christoph Grossmann, Gruenstadt (DE); Florian Scharf, Frankfurt (DE); Alexey Shilkin, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 158 days.

(21) Appl. No.: 14/202,735

(22) Filed: Mar. 10, 2014

(65) Prior Publication Data
US 2014/0251138 A1    Sep. 11, 2014

Related U.S. Application Data

(60) Provisional application No. 61/775,798, filed on Mar. 11, 2013.

(51) Int. Cl.
| | | |
|---|---|---|
| *B01D 19/02* | (2006.01) | |
| *B01D 3/16* | (2006.01) | |
| *B01D 3/20* | (2006.01) | |
| *B01D 3/30* | (2006.01) | |

(52) U.S. Cl.
CPC ........ *B01D 3/163* (2013.01); *B01D 3/20* (2013.01); *B01D 3/30* (2013.01)

(58) Field of Classification Search
CPC ............ B01D 3/163; B01D 3/20; B01D 3/30; B01D 19/02
USPC ............................ 261/62, 114.1, 114.4, 114.5
See application file for complete search history.

(56) References Cited

U.S. PATENT DOCUMENTS

| | | | | |
|---|---|---|---|---|
| 3,685,811 A * | 8/1972 | Heckmann | ............ | B01D 3/163 261/114.1 |
| 5,535,989 A * | 7/1996 | Sen | ........ | B01D 3/008 261/112.1 |
| 8,158,073 B2 * | 4/2012 | Maleta | ................ | B01D 3/163 261/108 |
| 8,333,940 B2 * | 12/2012 | Maleta | ................ | B01D 3/163 202/158 |

(Continued)

FOREIGN PATENT DOCUMENTS

| | | |
|---|---|---|
| DE | 28 46 679 A1 | 5/1980 |
| EP | 2 027 901 A1 | 2/2009 |

(Continued)

OTHER PUBLICATIONS

International Search Report and Written Opinion issued May 27, 2014 in PCT/EP2014/054596 with English Translation of Category of Cited Documents.

*Primary Examiner* — Charles Bushey
(74) *Attorney, Agent, or Firm* — Oblon, McClelland, Maier & Neustadt, L.L.P

(57) ABSTRACT

A valve for carrying out a mass-transfer process, in which a gas flows through liquid standing on a separating tray, when the gas supply is interrupted the liquid flows into a lock and, when the gas supply is restarted, the liquid flows out of the lock, wherein the valve contains a closing element which is designed in such a manner that, with the closing element in a first valve position, a first opening in a lower tray of the lock is closable, and the closing element is conducted in a first sleeve which is positioned between the upper tray bordering the lock and the lower tray in which sleeve, in the region of the lock, second openings are formed, and which projects over the upper tray and has a lift limiter for the closing element.

12 Claims, 6 Drawing Sheets

(56) References Cited

U.S. PATENT DOCUMENTS

| | | | |
|---|---|---|---|
| 2009/0145738 A1* | 6/2009 | Maleta | B01D 3/163 202/258 |
| 2009/0200690 A1* | 8/2009 | Maleta | B01D 3/20 261/114.4 |
| 2014/0252661 A1* | 9/2014 | Giese | B01D 3/163 261/62 |
| 2014/0252663 A1* | 9/2014 | Giese | B01D 3/30 261/83 |

FOREIGN PATENT DOCUMENTS

| | | |
|---|---|---|
| EP | 2 033 698 A1 | 3/2009 |
| RU | 2 237 508 C1 | 10/2004 |
| WO | WO 2008/150251 A1 | 12/2008 |

\* cited by examiner

METHOD FOR CARRYING OUT A MASS-TRANSFER PROCESS IN A COLUMN

BACKGROUND OF THE INVENTION

Field of the Invention

The invention relates to a method for carrying out a mass-transfer process in a column comprising at least two separating trays, wherein each separating tray comprises an upper tray and a lower tray, between the trays a lock is formed and valves are provided which are designed in such a manner that a gas can flow through the separating tray, on interruption of the gas flow liquid flows from the upper tray into the lock, and when gas supply is restarted, the liquid flows out of the lock. The invention further relates to a valve for carrying out a mass-transfer process, in which a gas flows through liquid standing on a tray, when the gas supply is interrupted the liquid flows into a lock, and, when the gas supply is restarted, the liquid flows out of the lock, wherein the valve comprises a closing element which is designed in such a manner that, with the closing element in a first valve position, an opening in a lower tray of the lock is closable, and the closing element is conducted in a sleeve which is positioned between an upper tray bordering the lock and a lower tray, in which sleeve, in the region of the lock, openings are formed, and which projects over the upper tray and has an upper stop for the closing element.

BRIEF SUMMARY OF THE INVENTION

Methods for carrying out mass-transfer processes in which separating trays are used that comprise an upper tray and a lower tray, between which a lock is formed and in addition valves are provided which are designed in such a manner that a gas can flow through the separating tray and, an interruption of the gas flow liquid flows from the upper tray into the lock, and when gas supply is restarted, flows out of the lock onto the separating tray therebeneath, are known, for example, from EP 2 033 698 A1, EP 2 027 901 A1 or RU 2 237 508 C1. The valves disclosed in these documents each comprise a closing element which comprises two valve disks which are connected to one another by a spacer strip. In a first position of the closing element, an outlet opening from the valve is closed with the lower valve disk, through which outlet opening the liquid can flow out from the lower tray to the separating tray therebeneath. At the same time, the second valve disk is situated in a position which permits liquid flow from the upper tray into the lock. In a second position, the closing element is raised in such a manner that gas can flow through the lower opening in the valve first into the lock and then can flow around the lower valve disk through openings in the valve housing through the lock in the direction of the upper tray, wherein the gas on the upper tray is passed through the liquid standing on the tray.

A disadvantage of the method known from the prior art is that the valves can become blocked, and so the liquid does not flow out of the lock when gas supply is restarted, or an excessively high gas pressure is necessary in order to open the valve. This can lead to an impairment in separating efficiency.

It is an object of the present invention, therefore, to provide a method for carrying out a mass-transfer process in a column which can be carried out in a stable manner without the separation efficiency being impaired.

DETAILED DESCRIPTION OF THE INVENTION

The object is achieved by a method for carrying out a mass-transfer process in a column comprising at least two separating trays, wherein each separating tray comprises an upper tray and a lower tray, between the trays a lock is formed, and valves are provided which are designed in such a manner that a gas can flow through the separating tray, on interruption of the gas flow liquid flows from the upper tray into the lock, and when gas supply is restarted, the liquid flows out of the lock, comprising the following steps:

(a) flow of a gas exiting through valves in the tray through a liquid standing on the upper tray, wherein the amount of gas is high enough that no liquid flows back through the valve, (b) interruption of the gas supply in such a manner that the liquid runs through the valves into the lock, (c) restart of the gas supply, wherein valves in the lower tray open, in such a manner that the liquid flows out of the lock, wherein the lock is dimensioned in such a manner that the lock, after the liquid has drained from the upper tray into the lock, is at most 70% filled with liquid.

The expression "gas", in the context of the present invention, is taken to mean all gaseous substances, in particular also vapor.

Filling the lock to a maximum of 70% after drainage of the liquid from the upper tray gives the best ratio of separation efficiency to throughput of a tray. This is due to the fact that the lock must be degassed during the filling operation. In addition, liquid which is situated above the closing element, at the start of the restarted gas supply into the column is in part forced back to the upper tray. This leads to backmixing of the liquid and therefore to an impairment in separation efficiency. The amount of liquid forced back by the closing element to the upper tray is reduced with decreasing fill level. In this case, it has been found that in the case of filling the lock to a maximum of 70%, the amount of liquid which is forced to the upper tray when gas supply is restarted is so low that backmixing is negligible.

In a preferred embodiment the height of the liquid standing on the upper tray is at least 2 cm, preferably at least 4 cm and at most 30% of the distance between two separating trays, i.e., the upper tray of the lower separating tray and the lower tray of the upper separating tray. The height of the liquid standing on the upper tray in this case is the height which the liquid occupies when a gas does not flow through it. Owing to the minimum height of 4 cm, the residence time of the gas bubbles is high enough that a sufficient approximation to the thermodynamic equilibrium between liquid and gas is achieved.

The maximum height of the liquid through which the gas does not flow on the upper tray is approximately 30% of the spacing between the upper tray of a lower separating tray and the lower tray of an upper separating tray, hereinafter termed tray spacing. The tray spacing depends in this case on the gas flow rate, in particular on the entrainment of liquid by the gas and also on liquid properties, for example tendency to foaming. Generally, the tray spacing is in a range between 0.25 and 0.9 m. In the case of column diameters of greater than 3 m, however, the height of the tray support increases substantially and defines the tray spacing. In these cases, the height of the support structure required by statics is added to the tray spacing.

The minimum lock height can be calculated by the following equation:

$$H_S = \frac{w_L \cdot t}{0.7}.$$

In this equation $H_S$ denotes the lock height, is the specific liquid flow rate, t is the contact time between liquid and gas. The specific liquid flow rate $w_L$ is calculated as $V_L/A$, wherein $V_L$ is the liquid flow rate in $m^3/h$ and A is the column cross-sectional area.

The contact time t and the column diameter are determined from the thermodynamics and fluid dynamics of the process carried out in the column. In establishing these parameters, in addition, it is necessary to take care that the empirical condition $$\frac{0.04}{0.7} \leq H_S \leq \frac{0.3 \cdot TS}{0.7}$$

is met. In this case, TS is the tray spacing.

In a preferred embodiment, when the valve is open, the ratio of the open cross-sectional area on an upper tray to the cross-sectional area of the column is in the range from 0.02 to 0.2, preferably in the range from 0.05 to 0.15. This opening ratio corresponds to a velocity at the gas outlet of the valve of up to 20 m/s. In the event of too large a free cross-sectional area, at the closing element fluctuations occur, wherein the liquid, during the contact time with the gas, occasionally passes by the closing element and arrives at the separating tray therebeneath. This also leads to backmixing and thus to impairment of the separation efficiency.

The opening ratio is in addition decisive for the function of the valve used. A lift force acts on the closing element when a gas flows through, wherein the lift force is the product of the pressure difference and the area of the closing element. Against the lift force act the force due to gravity of the closing element and also the force due to gravity of the liquid above the closing element.

The pressure difference on the closing element is composed of two parts. Firstly, what is termed the dry pressure drop, i.e. the pressure drop of the tray, and the pressure drop which is caused by the liquid column above the valve. The dry pressure drop in this case is a complex function of the geometry of the valve, the free cross-sectional area thereof based on the column cross section and the weight of the closing element. For an opening ratio, i.e. a ratio of the open cross-sectional area on an upper tray to the cross-sectional area of the column, in the range from 0.02 to 0.2, this gives an optimum operation of the column.

When the gas supply is restarted at the lower end of the column, the individual closing elements of the valves are lifted. In this case, a response time of a closing element, i.e. the time between the start of motion of the closing element to reaching the upper end position, for a mean vapor velocity at the intake surface of the closing element from 10 to 15 m/s, of approximately 0.2 to 0.4 s results. The gas flow pulse acting on the following separating tray is correspondingly delayed by this time. For a large number of trays, this produces a marked delay in the switching time of the valves on the lowest separating tray and the uppermost separating tray. At a number of separating trays of 40, the minimum switching delay is thus, for example, 8 to 16 s. This leads to the contact time of the gas with the liquid on the upper separating trays being shortened by the delay time in each case.

This effect can be counteracted by continuously reducing the opening ratio of the valves on the separating trays from the column bottom in the direction towards the column top. The maximum difference in the opening ratio of the upper separating tray and the lower separating tray in this case is preferably 5%. Via the reduction of the opening ratio, a higher lift force and therefore a more rapid response time of the valves on the separating trays in the upper region of the column are achieved.

At the start of the gas supply into the column, a lifting force due to the pressure difference acts on the closing element. Under the influence of this lifting force, the closing element moves upwards and thus releases openings in the lower tray through which the liquid can flow out from the lock. The liquid thereby drains in counterflow to the gas out of the lock. This leads to restrictions in the maximum gas velocity at the entry into the valve. The maximum gas velocity in this case is affected by the opening ratio of the lower tray. When a maximum permitted gas velocity is exceeded which occurs in the event of too small an opening ratio, the liquid is in part retained in the lock or may even be entrained by the ascending gas flow onto the upper tray. Therefore, it is preferred that when the valve is open the ratio of the open cross-sectional area of the upper tray to the open cross-sectional area of the lower tray corresponds at least to the ratio of the open cross-sectional area to the cross-sectional area of the column divided by 0.8 and is a maximum of 0.25. It is preferred when the ratio of the open cross-sectional area of the upper tray to the open cross-sectional area of the lower tray corresponds at least to the ratio of the open cross-sectional area to the cross-sectional area of the column divided by 0.5 and is a maximum of 0.15. For the ratio of the open cross-sectional area of the upper tray to the open cross-sectional area of the lower tray, the following therefore applies:

$$\frac{\varphi}{0.8} \leq \frac{a_o}{a_u} \leq 0.25,$$

and preferably, for the ratio, the following applies:

$$\frac{\varphi}{0.5} \leq \frac{a_o}{a_u} \leq 0.2.$$

In this case $\varphi = a_o/A$, wherein $a_o$ is the open cross-sectional area of the upper tray and A is the cross-sectional area of the column. $a_u$ is the open cross-sectional area of the lower tray.

The mass-transfer process which is carried out in the column is, for example, a rectification, a distillation, an absorption or a stripping (desorption). In the case of a rectification or stripping, it is possible, for example, to interrupt the gas supply, in that, via synchronized valves, preferably synchronized quick-closing valves, evaporator and condenser are separated off from the column. In this manner, the gas phase is confined in the column. The pressure difference between the bottom of the column and the top of the column that builds up during the contact time of the gas with the liquid then equalizes. Condensing out the vapors in the condenser gives a reduced pressure. Preferably, the supply of the heating medium to the evaporator is not interrupted. This leads to the vapor pressure rising in the evaporator. In order to avoid excessive pressure variations and thus possible mechanical damage to the column internals, the gas is preferably stored temporarily in an external buffer container or a buffer container integrated into the evaporator. The volume of this buffer container depends in this case on the time for which the gas supply into the column is interrupted. In this case, in addition, the switching delay must be taken into account. The volume of the buffer container in this case is preferably designed in such a manner that the maximum pressure in the buffer container does not exceed twice the operating pressure at the bottom of the column.

In order to restart the gas supply, the synchronized valves on the evaporator and condeser are reopened. During opening of the valves, firstly a vapor stream from the column into the condenser results, and at the same time vapor at high impulse on account of the pressure that has built up flows out of the buffer container into the column. The movement of the closing elements is therefore initiated simultaneously from two directions, namely first via the outflow of the vapor from the column, and secondly via the inflow of the vapor into the column from the buffer container. This has the advantage that the response time delay at the closing elements of the individual separating trays is considerably reduced.

If the mass-transfer process carried out in the column is an absorption, the same method is employed. In this case, however, the synchronized valves ensure that the pressure equalization and therefore the overflow time are implemented as rapidly as possible.

At the start of the interruption of the gas supply, the closing elements fall into the lower end position thereof on account of their mass and the weight of the liquid standing above the closing elements and thus close the openings in the lower tray. Since no vapor flows through the valves, the liquid can then drain from the upper tray through the openings in the upper tray into the lock. On account of the pressure profile in the column, namely a pressure decreasing from the bottom toward the top, corresponding to the pressure drop of the individual trays, pressure equalization within the column is sought. The pressure difference, during interruption of the gas supply, first acts as motive force for a gas flow, despite the inlet and outlet being separated off. The pressure in the entire column begins to equalize. As a result of the pressure equalization, in the lower region of the column secondary vapors form, because the liquid present there is brought to boiling when the ambient pressure falls. Since the closing elements have already reached their lower end position, and the lower trays of each separating tray are hydraulically sealed, the pressure equalization within the column proceeds abruptly. The pressure rise below a tray owing to the secondary vapors formed moves a part of the closing element upward until the openings in the lower tray are cleared to the extent that gas can flow into the lock. Since the gas pressure and the gas velocity are insufficiently high in order to keep the liquid on the lower tray in the lock, there is the risk that some of the liquid drains out of the lock onto the separating tray therebeneath and from there into the lock lying beneath. This leads to mixing of the liquids having differing concentrations and thereby to a considerable reduction of the separation efficiency. In order to reduce the drainage of the liquid due to ascending secondary vapors, it is preferred in each case, in the lower tray, in addition, to receive pressure equalization valves. Secondary vapors that are formed can escape upward through the pressure equalization valves. The cross-sectional area of the pressure equalization valves is selected in this case in such a manner that no liquid drains off during opening of the pressure equalization valves owing to ascending gases or vapors. The pressure equalization valves used can be designed to be identical in construction to any desired conventional movable valves that are known to those skilled in the art. Suitable pressure equalization valves comprise, for example, a movable plate and also lift and fall limiters. The fall limiter in this case is the lower tray and the lift limiter limits the movement of the plate upward. The movable plate in this case is constructed in such a manner that, in the absence of a gas or vapor flow, the lock is hydraulically sealed in the region of the pressure equalization valves. In order that, in the event of a secondary flow formed for pressure equalization, only the pressure equalization valves open, it is further preferred when the closing element of the pressure equalization valves has a lower mass than the closing element of the valves through which the liquid drainage is to proceed. This leads to the situation that, in the event of a pressure equalization, first the pressure equalization valves respond and the closing elements of the valves which permit liquid drainage remain in their lower position. The lift of the closing elements of the pressure equalization valves in this case is dependent on the gas or vapor velocity and the drainage of liquid, owing to the small opening of the pressure equalization valves is excluded. After completion of the pressure equalization process, the movable plates of the pressure equalization valves again adopt their lower end position on the tray and seal the lock hydraulically.

It is preferred if the maximum outflow area of the pressure equalization valves relative to the column cross-sectional area is between 0.005 and 0.03.

A suitable valve for carrying out the mass-transfer process, in which a gas flows through liquid standing on a tray, when the gas supply is interrupted the liquid flows into a lock and, when the gas supply is restarted, the liquid flows out of the lock, comprises a closing element which is designed in such a manner that, with the closing element in a first valve position, an opening in a lower tray of the lock is closable, and the closing element is conducted in a sleeve which is positioned between an upper tray bordering the lock and a lower tray in which sleeve, in the region of the lock, openings are formed, and which projects over the upper tray and has an upper stop for the closing element. The closing element comprises a hood having an upper plate and a rim extending downward, wherein, in the rim extending downward, openings are received peripherally, which openings are positioned in such a manner that the openings at least in part overlap with openings in the sleeve above the upper tray when the valve is open, wherein, when the valve is open, the hood of the closing element lies against the upper stop on the sleeve, or wherein the closing element comprises a piston rod, an upper closing element and a lower closing element, wherein the upper and lower closing element are each designed in the form of a valve disk, and the lower closing element has a larger diameter than the upper closing element and the sleeve in the lower region has a greater diameter than in the upper region, in such a manner that both the lower closing element and the upper closing element are conducted in the sleeve, or wherein the upper and the lower closing elements are designed in the form of a valve disk which are connected to a second, movable sleeve, wherein the sleeve is conducted on an axle.

The advantage of the upper closing element configured as a hood is that when the opening in the lower tray is closed, in the first valve position the liquid on the upper tray can drain unimpeded through the openings in the sleeve above the upper tray into the lock. In addition, owing to the geometry of the openings received peripherally in the hood rim extending downward, the pressure difference required for the lifting force of the closing element can be set. A maximization of the lifting force may be achieved when the upper stop for the hood is formed at the upper end of the sleeve by a whole plate.

When the upper closing element is configured in the form of a hood, then the closing element, in a first embodiment, comprises an upper closing element and a lower closing element, wherein the hood forms the upper closing element, and the lower closing element is configured in such a manner that, with the lower closing element in the first valve position, the opening in the lower tray is closed. Preferably, the lower closing element is configured in the form of a valve disk. The upper closing element and the lower closing element can in this case also be connected to one another by a sleeve conducted on an axle.

In a second embodiment, the hood forms the closing element, wherein the hood is configured in such a manner that, in the first valve position the hood rim extending downward lies on an edge that encloses the opening in the lower tray and thus closes the opening in the lower tray, wherein the openings in the sleeve, in the region of the lock, are arranged in such a manner that the openings in the sleeve and the openings in the hood do not overlap in the first valve position. Because the openings in the sleeve and the openings in the hood do not overlap in the first valve position, the outlet from the lock is closed. In the case of the hood position in the second valve position, i.e. in the upper position, the openings are open, and so gas can flow unobstructed through the lock to the upper tray. As soon as the gas supply is interrupted, the hood comes again into the first valve position, and the liquid can flow into the lock through openings in the sleeve. Since the openings in the hood and the openings in the sleeve do not overlap, the liquid remains in the lock. As soon as the gas supply is restarted, owing to the pressure difference the hood is lifted and the liquid can then flow out of the lock through lower openings in the sleeve.

When the closing element is configured in such a manner that the upper closing element and the lower closing element are each constructed in the form of a valve disk and the lower closing element has a larger diameter than the upper closing element, it is preferred if the ratio of the diameter of the upper closing element to the diameter of the lower closing element is in the range from 0.5 to 0.9. It is particularly preferred if the ratio of the diameter of the upper closing element to the diameter of the lower closing element is in the range from 0.6 to 0.85. By configuring the upper closing element and the lower closing element in the form of a valve disk in each case it is possible to select the spacing between the individual valves that is optimum for the mass transfer and independent of the opening ratio of the lower tray plate.

When the upper closing element and the lower closing element are each configured in the form of a valve disk which have a different diameter, it is, in addition, advantageous when the respective sleeves in which the closing elements run correspond to the diameter of the closing elements and have in each case at the upper end a lift limiter. At the lower end, the sleeves have a fall limiter in order to avoid the closing element falling out of the sleeve. The lift and fall limiters on the sleeve constructed in differing diameters are preferably constructed in the form of folds which the respective closing element strikes in the first or second valve position.

An advantage of the configuration of the closing element in such a manner that the upper closing element and the lower closing element are connected to a sleeve which runs on an axle is that the closing element is conducted between the upper end position and the lower end position thereof and cannot tilt. The axle in this case is preferably fastened centered in the outer sleeve above the upper stop of the closing element and below the lower stop of the closing element. This can be performed in any manner known to those skilled in the art, for example by bolting. When the upper stop is designed as a hood on the sleeve, the upper fastening of the axle is preferably centered in the hood cover. Alternatively, however, it is also possible to provide spokes which converge in the center point of the sleeve and on which the axle is fastened. This is possible not only for the upper fastening but also for the lower fastening.

If the closing element comprises a piston rod, an upper closing element and a lower closing element, regardless of whether the upper closing element is configured in the form of a valve disk or a hood, it is further preferred if the upper closing element and the lower closing element are each movably connected to the piston rod. The movable connection to the piston rod avoids the closing element twisting and blocking when it is opened or closed in the sleeve in which it is conducted.

Embodiments of the invention are shown in the figures and are explained in the subsequent description.

BRIEF DESCRIPTION OF THE SEVERAL VIEWS OF THE DRAWINGS

In the drawings:

FIG. 1 shows a section of a column for carrying out a mass-transfer process having two separating trays, wherein the closing elements of the valves are situated in a first, lower valve position.

Figure 1:
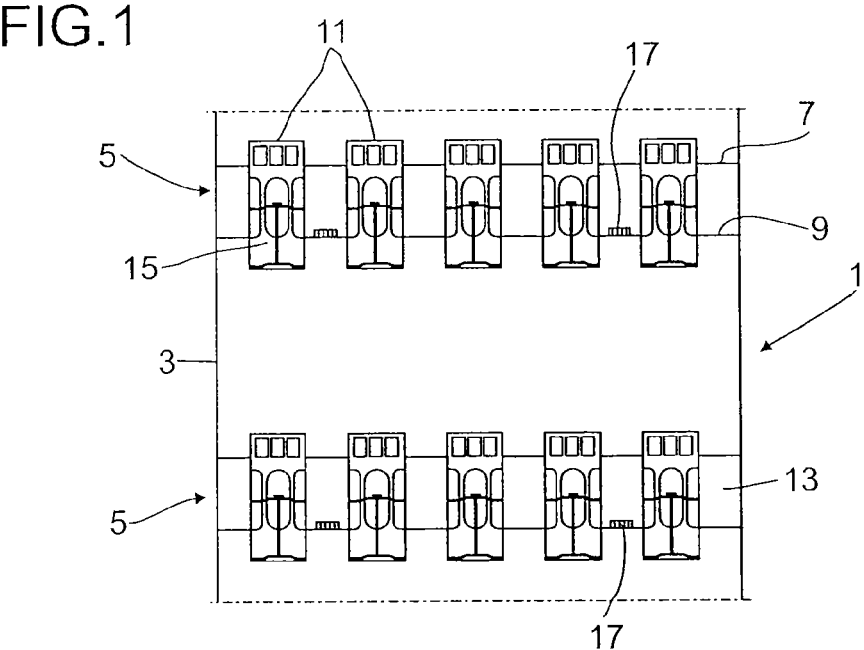
FIG. 1 shows a section of a column for carrying out a mass-transfer process having two separating trays, wherein the closing elements are situated in the first, lower valve position.

A column 1 for a mass-transfer process comprises a shell 3 and separating trays 5. The separating trays 5 in this case are usually connected to the shell 3.

In a column 1 constructed according to the invention for carrying out a mass-transfer process, the separating trays 5 comprise an upper tray 7, a lower tray 9 and valves 11 through which gas can flow in counterflow to a liquid.

A lock 13 is bordered by the lower tray 9 and the upper tray 7.

While a mass-transfer process is being carried out, liquid is situated on the upper tray 7 and a gas which flows through the valves 11 flows through the liquid. A mass-transfer process between the liquid and the gas takes place thereby. After a predetermined time period, the gas supply is interrupted. This leads to the valves 11 closing and the liquid flowing from the upper tray 7 into the lock 13. After all of the liquid has flowed into the lock 13, the gas supply is restarted, the valves 11 are reopened, the liquid flows from the lock 13 to the upper tray 7, that lies below the lock 13, of the separating tray 5 beneath, and gas again flows through the liquid. This method avoids backmixing of the liquid during the operation. During the operation, no liquid flows from a separating tray to a separating tray beneath.

In order to interrupt the gas supply, it is preferred to separate off the gas from the evaporator and from the condenser by two quick-closing valves. After separating off the gas flow, a pressure profile exists over the height of the column 1, corresponding to the pressure drop of the individual separating trays 5. This pressure difference acts as motive force for a gas flow despite the inlet and outlet being separated off. The pressure in the entire column starts to equalize. In the course of this pressure equalization, in the lower region of the column 1, secondary vapors form, because the liquid present there is brought to boiling when the ambient pressure falls. Since the closing elements 15 of the valves 11 are situated during the pressure equalization in the first, lower valve position thereof, they seal the lower tray 9 hydraulically. The pressure difference and the resultant pressure equalization lead to a part of the closing elements 15 being moved upward. After the pressure relief, the closing elements 15 fall back into the lower end position. While these closing elements 15 are lifted, however, the sealing of the lower tray 9, however, is no longer ensured and liquid can in part drain onto the tray beneath. This leads to backmixing of the liquid and thereby to considerable reduction of the separation efficiency.

In order to avoid the drainage of the liquid, it is therefore advantageous additionally to provide pressure equalization valves 17. As pressure equalization valves, valves can be used here as are used in conventional trays. Such valves usually have a movable plate and lift and fall limiters. The lower tray 9 serves as fall limiter in this case. The movable plate of the pressure equalization valve 17 in this case is constructed in such a manner that, in the absence of a gas flow, it hydraulically seals the lock. The pressure equalization valves 17 are preferably configured in such a manner that the movable plate has a lower mass than the closing element 15 of the valve 11 taking into account the back pressure difference of a liquid column standing over the valve. During the pressure equalization, the pressure equalization valves 17 respond before the closing elements 15 of the valves 11 are put in motion. In this case a gas velocity-dependent lift of the pressure equalization valves 17 is established. Drainage of the liquid through the same openings is excluded thereby.

After completion of the pressure equalization process, the movable plates of the pressure equalization valves 17 again adopt their lower end position on the tray.

It is preferred if the ratio of the maximum outflow surface of the pressure equalization valves 15 to the column cross-sectional area is in the range from 0.5 to 3%.

Figure 2:
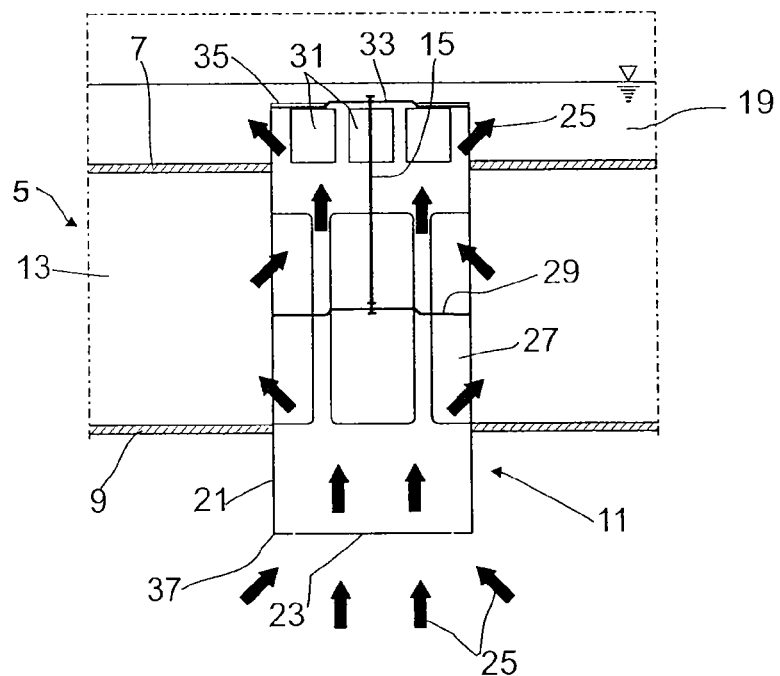
FIG. 2 shows gas flow during the mass-transfer process, while the closing element is situated in the second, upper closing position, for example at a valve.

In FIG. 2, a gas flow during the mass-transfer process is shown, when the closing element is situated in a second, upper valve position.

During the mass-transfer process, for example a distillation or an absorption, liquid 19 is situated on the upper tray 7 of the separating tray 5. The closing element 15 of the valve 11 is situated in a second, upper valve position. In this case the closing element 15 is conducted in a sleeve 21 which extends between the lower tray 9 and the upper tray 7. The sleeve 21 in this case has at the lower end thereof a first opening 23 through which gas can flow into the sleeve during the mass-transfer process. The gas flow is shown in this case with arrows 25.

In the region of the lock 13, the sleeve 21 has openings 27. The openings 27 are configured in such a manner that a lower closing element 29 of the closing element 15 is situated in a position which permits the gas to exit from the openings 27 below the lower closing element 29 and to reenter the sleeve through the openings 27 above the lower closing element 29. The lower closing element 29 in this case is preferably configured in the form of a valve disk.

According to the invention, the sleeve 21 projects beyond the upper tray 7, wherein further openings 31 are situated in the sleeve above the upper tray 7, through which openings the gas can flow into the liquid 19. In this case the openings 31 above the upper tray 7 are preferably configured in such a manner that, by the lower edge thereof, they finish flush with the upper tray 7.

In the second valve position shown in FIG. 2, an upper closing element 33 of the closing element 15 is situated above the openings 31 above the upper tray 7. The further openings 31 are thereby cleared above the upper tray 7 and are not blocked by the upper closing element 33.

Via the upper closing element 33, at the same time, the lift of the closing element 15 is limited, in that it strikes a lift limiter 35, preferably a rim on the sleeve 21. The closing element 15 in this case is kept by the gas flow in the second, upper valve position.

According to the invention, the opening ratio of the valve, depending on the gas velocity, is between 2 and 20%, preferably between 5 and 15%, wherein the opening ratio is the free cross-sectional area relative to the column cross section. For an opening ratio in the range between 2 and 20%, this corresponds to a velocity at the gas exit of the valve of up to 20 m/s. In the case of an excessively large free cross-sectional area, fluctuations occur at the closing element 15, wherein liquid can flow back from the upper tray 7 through the openings and onto the tray beneath. This leads to backmixing and thus to impairment of the separation efficiency. For this reason, the opening ratio should be selected in such a manner that as little liquid as possible can drain from the upper tray 7 through the further openings 31 against the gas flow during the mass-transfer process.

After a predetermined contact time, the gas supply is interrupted. As soon as the gas supply is interrupted, the closing element 15 falls into a first, lower valve position, as shown in FIG. 1.

The first opening 23 is thereby closed in such a manner that gas can no longer flow into the sleeve 21. To avoid the closing element 15 sliding through the sleeve, at the lower end of the sleeve 21 there is a fall limiter 37. The fall limiter in this case can be, for example, a ring-shaped edge on the sleeve 21. However, any other possible fall limiter is also possible which permits a tight sealing of the valve in the first valve position.

When the closing element 15 is situated in the first, lower valve position, and therefore gas can no longer flow through the valve, the liquid 19 flows from the upper tray 7 through the openings 31 above the upper tray 7 into the sleeve and then through the openings 27 into the lock 13. Since the first opening 13 is closed by the lower closing element 29, the liquid remains in the lock 13.

As soon as the liquid of the upper trays 7 of all separating trays 5 has drained off into the respective locks 13, the gas supply can be restarted. This is shown on one valve by way of example in FIG. 3.

The closing element 15 is lifted back into the second, upper valve position by the restarted gas supply. The opening 23 is cleared thereby. The cross-sectional area of the opening 23 is selected in this case in such a manner that the liquid can drain from the lock 13 in counterflow to the gas flow 25 through the valve onto the separating tray 5 beneath. The opening ratio of the first opening 23 is selected in this case in such a manner that even at maximum gas velocity, no liquid is retained in the lock 13 or even entrained to the upper tray.

Figure 4:
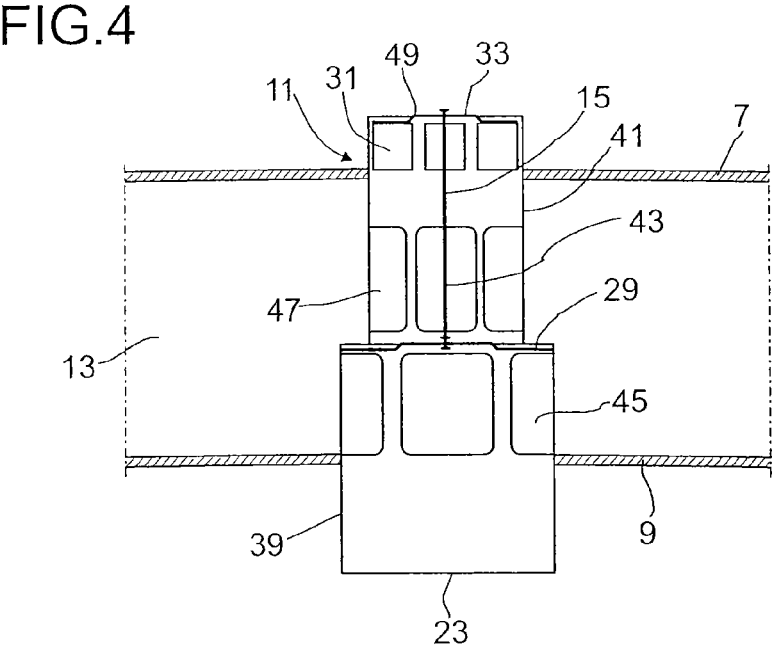
FIG. 4 shows a valve having a closing element in which the upper closing element and the lower closing element are constructed with different diameters.

An alternative embodiment of valve 11 is shown in FIG. 4.

In the embodiment shown in FIG. 4, the valve has a closing element 15 in which the upper closing element 33 and the lower closing element 29 are each configured in the form of a plate and are constructed with different diameters.

In order to ensure the function of valve 11, the lower closing element 29 is conducted in a lower sleeve section 39 and the upper closing element 33 is conducted in an upper sleeve section 41. The diameter of the lower sleeve section 39 corresponds in this case preferably to the diameter of the lower closing element 29, and the diameter of the upper sleeve section 41 corresponds to the diameter of the upper closing element 33. The lower closing element 29 and the upper closing element 33 in this case are preferably configured in the form of moving plates. The plates are connected to one another in this case with a piston rod 43. The piston rod 43 also connects in this case the upper closing elements 33 and lower closing elements 29 of the closing element 15 shown in FIGS. 1 to 3. To avoid twisting, the upper closing element 33 and the lower closing element 29 are preferably movably connected to the piston rod 43.

In order to ensure the function of the valve shown in FIG. 4, in the lower sleeve section 39, openings 45 are formed, wherein the openings lie within the lock 13 and are configured in such a manner that the openings 45, at the lower edge thereof, end flush with the lower tray 9. This ensures that all of the liquid standing on the lower tray 9 can drain out of the lock 13 through the valve 11.

Figure 3:
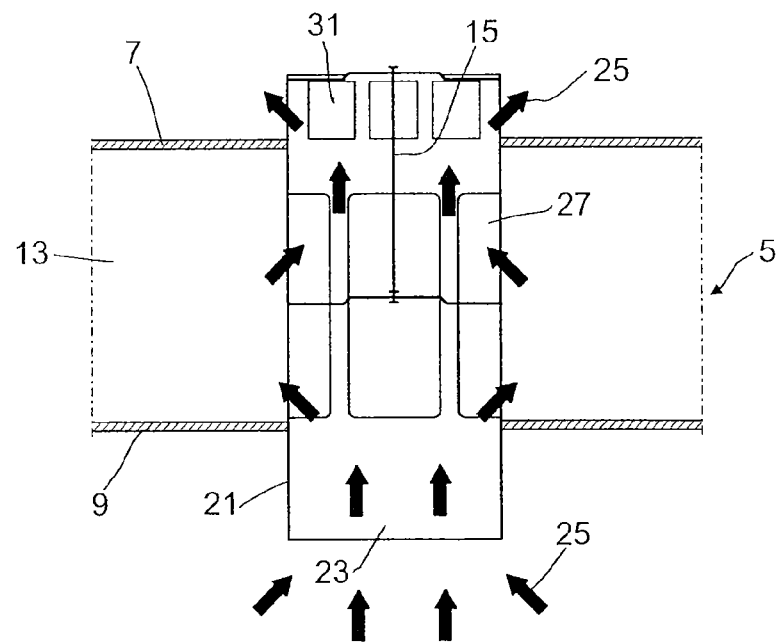
FIG. 3 shows the start of the gas flow and drainage of the liquid from the lock.

In order that both gas and liquid can flow through the valve 11, wherein the flow corresponds to that shown in FIGS. 2 and 3, further openings 47 in the upper sleeve section 41 are situated within the lock. The gas flowing from bottom to top through the openings 47 can flow from the lock 13 into the upper sleeve section 41. From the upper sleeve section 41, the gas then flows out through openings 31 above the upper tray 7.

In order to obtain a more rapid outflow of the liquid from the upper tray 7 into the lock 13, it is further preferred if, in addition to the openings 31, above the periphery of the upper sleeve section 41, there is a further opening 49 on the upper end face. When the closing element 15 is situated in the second, upper closing position, the further opening 49 is closed by the upper closing element 33. As soon as the gas supply is ended and the closing element 15 is situated in the first, lower closing position, the further opening 49 is cleared, and the liquid which is situated above the upper sleeve section 41 can, in addition to the openings 31, also flow into the lock 13 the opening 49. The total opening of the valve is increased thereby and the liquid can more rapidly drain into the lock 13 from the upper tray 7.

Figure 5:
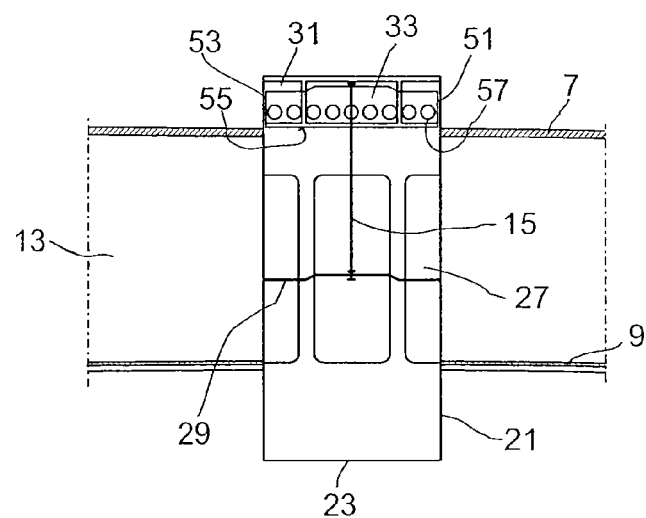
FIG. 5 shows a valve having an upper closing element constructed as a hood.

An alternative embodiment of the valve 11 is shown in FIG. 5.

In the embodiment shown in FIG. 5, the sleeve 21 corresponds to the sleeve of the valve as shown in FIGS. 2 and 3. In contrast to the embodiment shown in FIGS. 2 and 3, however, the upper closing element 33 is not constructed in the form of a plate, but in the form of a hood 51. The hood 51 is configured in this case in such a manner that a peripheral rim 53 of the hood is configured in such a manner that the lower edge 55 of the peripheral rim 53 is situated at the height of the upper side of the upper tray 7 when the closing element 15 is in the second, upper valve position thereof. In order that the gas can flow through the upper closing element 33 configured as a hood 51 and the openings 31 into the liquid, openings 31 in the peripheral rim 53 are formed in the peripheral rim 53 at the height of the openings 31. Via the openings 57 in the peripheral rim 53, the gas can then flow through the upper closing element 33 and the openings 31 into the liquid. The openings 57 in this case are configured, for example, in the form of a row of holes. Via the openings 57, the opening ratio of the valve may be adjusted in a simple manner. These openings may be varied by varying the number of the openings 57 or the size of the openings 57.

Figure 6:
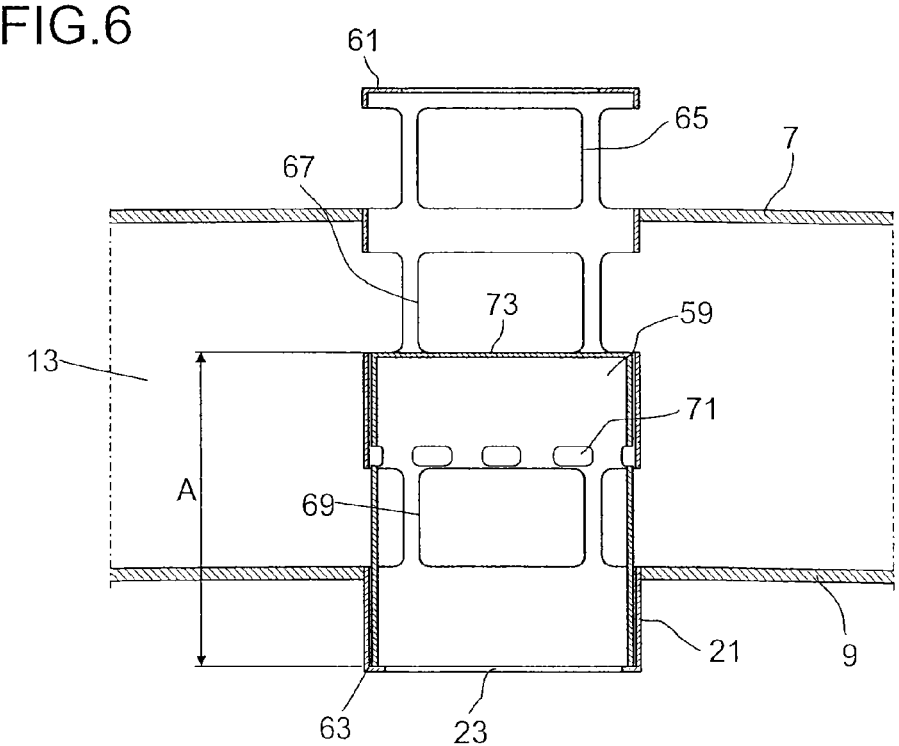
FIG. 6 shows a valve having a closing element constructed as a hood in a lower, first valve position.
Figure 7:
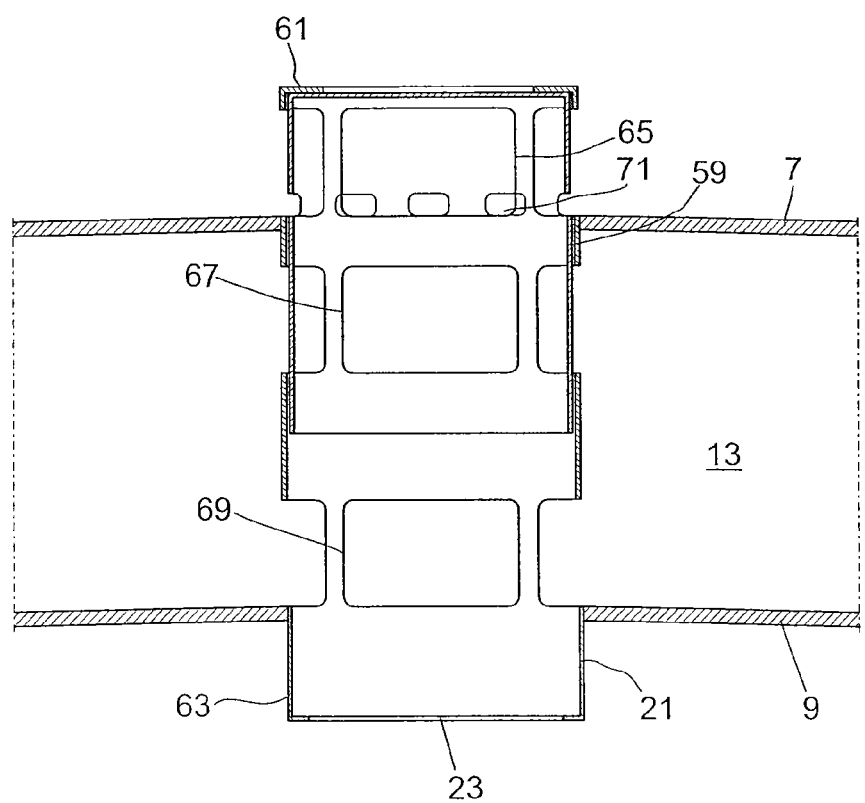
FIG. 7 shows the closing element constructed as a hood in a second, upper valve position.

An alternative embodiment of a closing element configured as a hood is shown in FIGS. 6 and 7.

In contrast to the closing elements shown in FIGS. 1 to 5, the closing element shown in FIGS. 6 and 7 does not comprise an upper closing element 33 and lower closing element 29, but comprises only one hood 59.

In FIG. 6, the closing element 59 that is configured as a hood is shown in a first, lower closing position, and in FIG. 7 is shown in a second, upper closing position. The closing element that is configured as a hood 59 is conducted in this case in a sleeve 21. The sleeve 21 is dimensioned so that it projects above the upper tray 7 and below the lower tray 9. In order that the closing element that is configured as a hood 59 is held in the sleeve 21, said sleeve comprises a lift limiter 61 and a fall limiter 63. The lift limiter 61 and the fall limiter 63 can be constructed in this case, for example, in the form of a fold on the sleeve 21. Alternatively, it is also possible to provide a ring which is formed on the sleeve 21. If the closing element that is formed as a hood 59 is situated in the first valve position, said closing element lies on the fall limiter 63. This is shown in FIG. 6. If the closing element that is configured as a hood 59 is situated in the upper, second valve position, said closing element lies against the lift limiter 61.

If the closing element that is configured as a hood 59 is in the first valve position, as shown in FIG. 6, no gas flows through the valve. This leads to liquid being able to drain from the upper tray 7 through an upper row of openings 65 in the sleeve 21 into the lock 13. In order that all of the liquid can drain from the upper tray 7 through the upper row of openings 65 into the lock 13, the individual openings of the upper row of openings 65 are configured in such a manner that they end flush with the upper tray 7.

Through the upper row of openings 65, the liquid first flows into the sleeve 21. Through a second row of openings 67, the liquid then drains out of the sleeve into the lock 13. A third row of openings 69 below the second row of openings 67, in the first valve position shown in FIG. 6, is closed via the closing element configured as a hood 59. The liquid is held thereby in the lock 13 and cannot drain out of the lock 13. In order that all of the liquid can drain out of the lock 13 as soon as the closing element configured as a hood 59 is situated in the upper, second valve position, the openings of the third row of openings 69 preferably end flush with the further tray 9 by their lower edge.

When a mass-transfer process is carried out, the closing element configured as a hood 59 is situated in the upper, second valve position, as shown in FIG. 7. In the upper, second valve position, the closing element configured as a hood 59 is held by the gas flow. For this purpose, the gas flows through the opening 23 into the sleeve 21 and forces the closing element configured as a hood 59 upward against the lift limiter 61. In order that the gas can flow into the liquid through the upper row of openings 65, in the hood 71, a row of openings 71 is formed. The row of openings 71 in the hood 59 is arranged in this case in such a manner that in the second, upper valve position, the openings of the row of openings 71 overlap with the openings of the upper row of openings 65 in such a manner that the gas can flow through the openings of the row of openings 71 and the openings of the upper row of openings 65 into the liquid on the upper tray 7. When the closing element configured as a hood 59 is situated in the lower, first valve position, the openings of the row of openings 71 are closed by the sleeve 21. For this purpose, the third row of openings 69 is configured in such a manner that the row of openings 71 is above the third row of openings 69 when the closing element configured as a hood 59 is situated in the first valve position.

The closing element formed as a hood 59 is preferably configured in such a manner that the height of the closing element configured as a hood 59 corresponds to the spacing from the fall limiter 63 to the lower edge of the openings of the second row of openings 67. This spacing is characterized by the letter A. In addition, the spacing between the upper edge of the openings of the row of openings 71 in the hood 59 and the cover 73 of the hood 59 preferably corresponds to the height of the openings of the second row of openings 67. In addition, it is advantageous if the cross-sectional area of the openings of the rows of openings 65, 67, 69 correspond in each case to the cross-sectional area of the sleeve 21.

Figure 8:
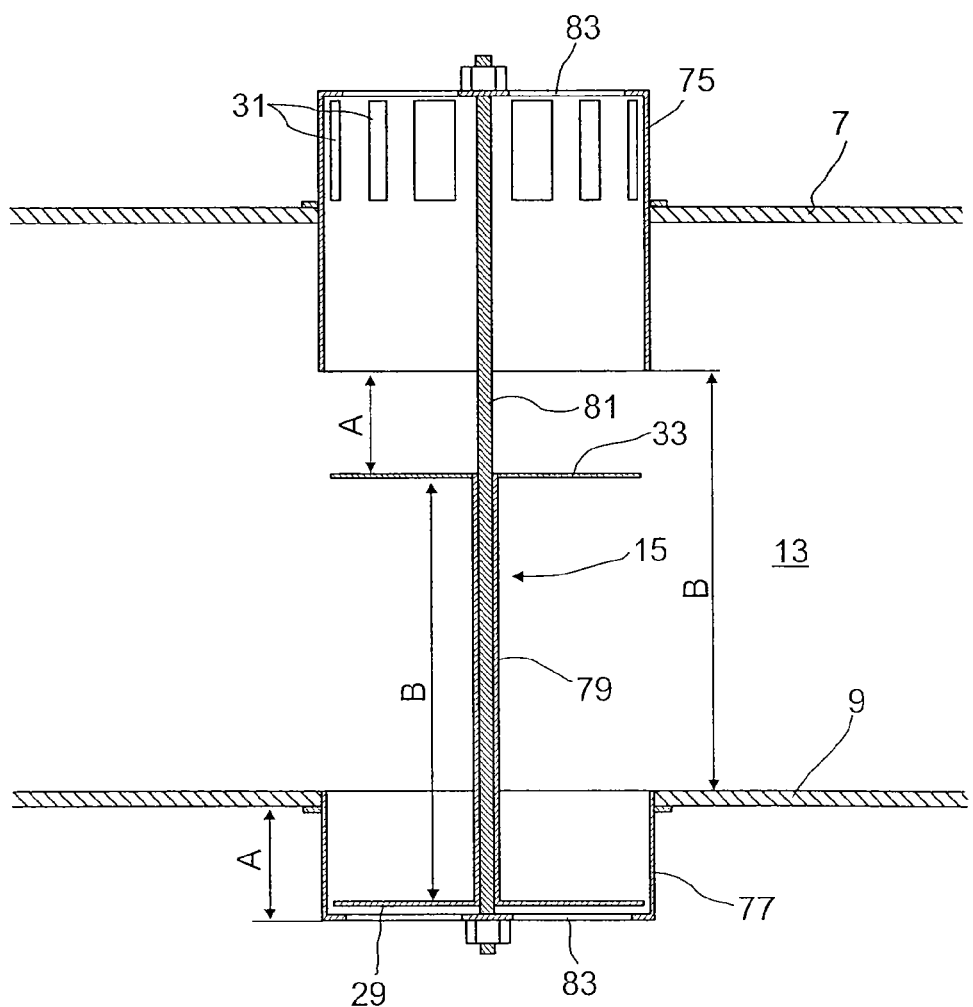
FIG. 8 shows a valve having a closing element having an upper closing element and a lower closing element which are fastened to a sleeve conducted on an axle.

FIG. 8 shows a valve having a closing element having an upper closing element and a lower closing element which are fastened on a movable sleeve conducted on an axle.

The valve shown in FIG. 8 comprises an upper sleeve 75 which is fastened in the upper tray 7. The upper sleeve 75 in this case extends into the lock 13 to such an extent that the distance between the lower end of the upper sleeve 75 and the lower tray 9 is at a maximum as great as the distance between the upper closing element 33 and the lower closing element 29 of the closing element 15. This distance is designated by the letter "B". It is preferred if the distance between the upper closing element 33 and the lower closing element 29 is somewhat greater than the distance between the lower tray 9 and the lower end of the sleeve 75, for example 5 to 10 mm greater.

The upper closing element 33 and the lower closing element 29 are configured in this case as valve disk in the embodiment shown here.

Above the upper tray 7, openings 31 are configured in the upper sleeve 75, through which openings, in operation, gas can flow and in the case of a positioning of the closing element 15 in the position shown here liquid can drain from the upper tray 7 into the lock 13.

In order that gas can flow through the valve when the closing element 15 is in the upper position thereof, it is in addition necessary that the overall length of the upper sleeve 75 is less than the distance between the upper closing element 33 and the lower closing element 29. In addition, in the lower position of the closing element 15 there must be a distance "A" between the upper closing element 33 and the lower end of the upper sleeve 75, in order that the liquid can flow from the upper tray 7 through the openings 31 into the upper sleeve 75 and out of the upper sleeve 75 further into the lock 13. For this purpose, the movement of the closing element 15 downwards is limited by a lower sleeve 77 which projects downwards from the lower tray 9 by the distance A. When the distance "B" between the lower tray 9 and the lower end of the upper sleeve 75 is somewhat greater than the distance between the upper closing element 33 and the lower closing element 29, it is advantageous if the lower sleeve also projects downwards out of the lower tray further than the distance between the upper closing element 33 and the lower end of the upper sleeve 75.

In the embodiment shown here, the upper closing element 33 and the lower closing element 29 are connected to one another by a sleeve 79. The sleeve 79 in this case is conducted on an axle 81. By conducting the sleeve 79 on the axle 81, tipping and tilting of the closing element 15 is prevented.

The axle 81 on which the sleeve 79 is conducted, is preferably fastened in the upper sleeve 75 and the lower sleeve 77. For this purpose it is possible, for example, to provide spokes which converge in the cross-sectional center point of the sleeve 75, 77. In the cross-sectional center point, the axle 81 can then be fastened, for example by bolting, as shown here. The spokes serve in this case preferably at the same time as upper stop, or lower stop, respectively, for the closing element 15.

Figure 9:
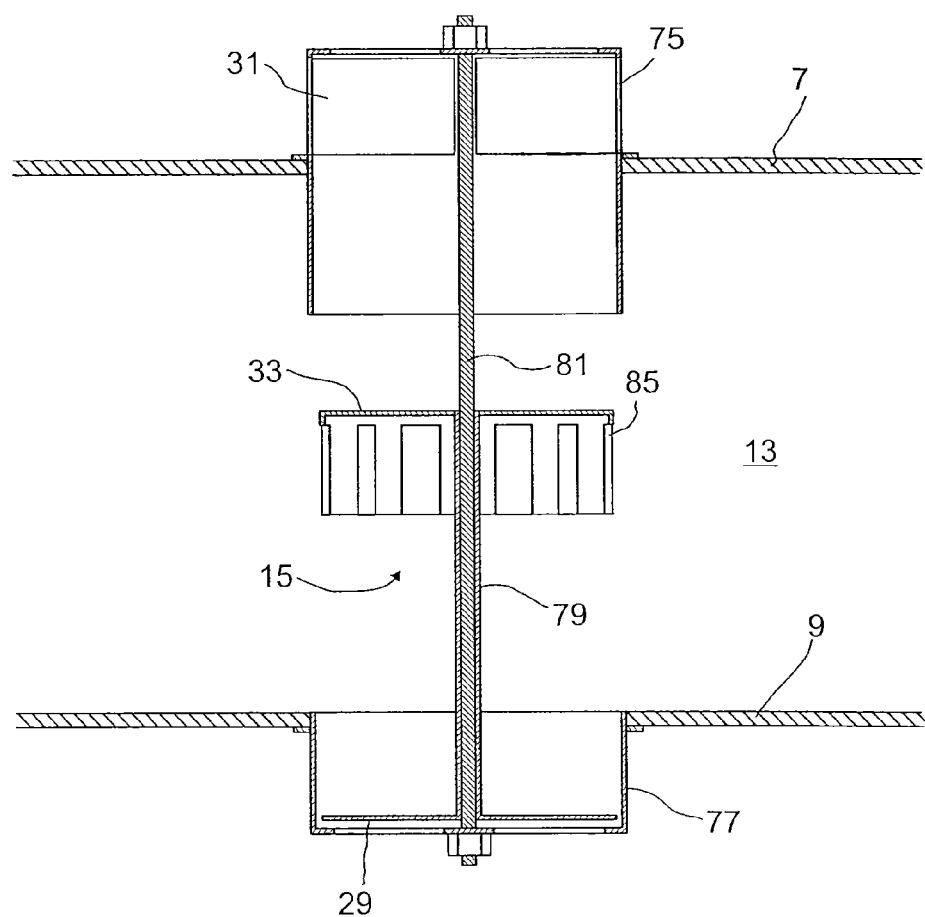
FIG. 9 shows a valve having a closing element in which an upper closing element and a lower closing element are fastened to a sleeve conducted on an axle, wherein the upper closing element is configured in the form of a hood.

An alternative embodiment of a closing element conducted on an axle is shown in FIG. 9.

In contrast to the closing element 15, shown in FIG. 8, in the case of the closing element 15 shown in FIG. 9, the upper closing element 33 is configured in the form of a hood 85. In the hood 85, in this case, openings 87 are formed through which the gas can flow into the liquid on the upper tray 7 when the closing element 15 is in its upper position. For this purpose it is necessary that the openings 31 in the upper sleeve 75 are designed in such a manner that the openings 87 in the hood 85 are not closed when the closing element 15 is in its upper position.

LIST OF REFERENCE SIGNS 1 column
3 shell
5 separating tray
7 upper tray
9 lower tray
11 valve
13 lock
15 closing element
17 pressure equalization valve
19 liquid
21 sleeve
23 first opening
25 gas flow
27 opening
29 lower closing element
31 openings above the upper tray 7
33 upper closing element
35 lift limiter
37 fall limiter
39 lower sleeve section
41 upper sleeve section
43 piston rod
45 openings in the lower sleeve section 39
47 openings in the upper sleeve section 41
49 further openings
51 hood
53 peripheral rim
55 lower edge of the peripheral rim 53
57 opening
59 hood
61 lift limiter
63 fall limiter
65 upper row of openings
67 second row of openings
69 third row of openings
71 row of openings in the hood 59
73 cover of the hood 59
75 upper sleeve
77 lower sleeve
79 sleeve
81 axle
83 spoke
85 hood
87 opening

The invention claimed is:

1. A valve for carrying out a mass-transfer process, in which a gas flows through liquid standing on a separating tray (5), when the gas supply is interrupted the liquid flows into a lock (13) and, when the gas supply is restarted, the liquid flows out of the lock (13), wherein the valve (11) comprises a closing element (15) which is designed in such a manner that, with the closing element (15) in a first valve position, an opening (23) in a lower tray (9) of the lock (13) is closable, and the closing element (15) is conducted in a sleeve (21) which is positioned between the upper tray (7) bordering the lock (13) and the lower tray (9) in which sleeve, in the region of the lock (13), openings (27) are formed, and which projects over the upper tray (7) and has a stroke limit (35) for the closing element (15), wherein the closing element (15) comprises a hood (51; 59) having an upper plate (73) and a rim (53) extending downward, and, in the rim (53) extending downward, openings are received (57; 71), which openings are positioned in such a manner that the openings (57; 71) at least in part overlap with openings (31; 65) in the sleeve (21) above the upper tray (7) when the valve (11) is open, wherein, when peripherally the valve (11) is open, the hood (51; 59) of the closing element lies against the upper stroke limit (35; 61) on the sleeve (21), or wherein the closing element (15) comprises a piston rod (43), an upper closing element (33) and a lower closing element (29), wherein the upper (33) and lower (29) closing element are each designed in the form of a valve disk, and the lower closing element (29) has a larger diameter than the upper closing element (33) and the sleeve (21) in the lower region has a greater diameter than in the upper region, in such a manner that both the lower closing element (29) and the upper closing element (33) are conducted in the sleeve, or wherein the upper closing element (33) and the lower closing element (29) are connected to a sleeve (79), wherein the sleeve (79) is conducted on an axle (81).

2. The valve according to claim 1, wherein the ratio of the diameter of the upper closing element (33) to the diameter of the lower closing element (29) is in the range from 0.5 to 0.9.

3. The valve according to claim 1, wherein the closing element (15) comprises a piston rod (43), an upper closing element (33) and a lower closing element (29), wherein the hood (51) forms the upper closing element (33), and the lower closing element (29) is configured in such a manner that, with the lower closing element (29) in the first valve position, the opening (23) in the lower tray is closed.

4. The valve according to claim 1, wherein the upper closing element (33) and the lower closing element (29) are each movably connected to the piston rod (43).

5. The valve according to claim 1, wherein the hood (59) forms the closing element, wherein the hood (59) is configured in such a manner that, in the first valve position the hood (59) rim extending downward lies on an edge that encloses the opening in the lower tray as falling limit (63) and thus closes the opening (23) in the lower tray (9), wherein the openings (69) in the sleeve (21), in the region of the lock, are arranged in such a manner that the openings (69) in the sleeve (21) and the openings (71) in the hood (59) do not overlap in the first valve position.

6. A method for carrying out a mass-transfer process in a column (1) comprising at least two separating trays (5), wherein each separating (5) comprises an upper tray (7) and a lower tray (9), and between the trays (7, 9) a lock (13) is formed, and the valves (11) of claim 1 are provided which are designed in such a manner that a gas can flow through the separating tray (5), on interruption of the gas flow liquid flows from the upper tray (7) into the lock (13), and when gas supply is restarted, the liquid drains out of the lock (13), the method comprising:
   (a) allowing flow of a gas to exit through valves (11) in the separating tray (5) through a liquid standing on the upper tray (7), wherein the amount of gas is high enough that no liquid flows back through the valve (11),
   (b) interrupting the gas supply in such a manner that the liquid runs through the valves (11) into the lock (13), and
   (c) restarting the gas supply, wherein valves (11) in the lower tray (9) open, in such a manner that the liquid drains out of the lock (13),
   wherein the lock (13) is dimensioned in such a manner that the lock (13), after the liquid has drained from the upper tray (7) into the lock (13), is at most 70% filled with liquid.

7. The method according to claim 6, wherein the height of the liquid standing on the upper tray (7) is at least 2 cm and at most 30% of the distance between two separating trays (5).

8. The method according to claim 6, wherein, when the valve (11) is open, the ratio of the open cross-sectional area on the upper tray (7) to the cross-sectional area of the column (1) is in the range from 0.02 to 0.2.

9. The method according to claim 6, wherein, when the valve (11) is open, the ratio of the open cross-sectional area of the upper tray (7) to the open cross-sectional area of the lower tray (9) corresponds at least to the ratio of the open cross-sectional area to the cross-sectional area of the column divided by 0.8, and is a maximum of 0.25.

10. The method according to claim 6, wherein, in the lower tray (9), in addition, pressure equalization valves (17) are received.

11. The method according to claim 6, wherein the mass-transfer process is a distillation, a rectification, an absorption or a stripping.

12. The method according to claim 6, wherein, when the gas supply is interrupted, the gas is stored temporarily in an external buffer container or a buffer container integrated into the evaporator.

* * * * *